United States Patent
Hayes et al.

(10) Patent No.: US 11,977,538 B2
(45) Date of Patent: May 7, 2024

(54) DURABLE FUNCTIONS IN DATABASE SYSTEMS

(71) Applicant: Singlestore, Inc., San Francisco, CA (US)

(72) Inventors: Bailey Hayes, Cary, NC (US); Carl Sverre, Vancouver (CA)

(73) Assignee: Singlestore, Inc., San Francisco, CA (US)

( * ) Notice: Subject to any disclaimer, the term of this patent is extended or adjusted under 35 U.S.C. 154(b) by 98 days.

(21) Appl. No.: 17/679,910

(22) Filed: Feb. 24, 2022

(65) Prior Publication Data

US 2023/0267115 A1    Aug. 24, 2023

(51) Int. Cl.
*G06F 16/23* (2019.01)
(52) U.S. Cl.
CPC .............. *G06F 16/2379* (2019.01)
(58) Field of Classification Search
CPC .................................................. G06F 16/2379
See application file for complete search history.

(56) References Cited

U.S. PATENT DOCUMENTS

| | | |
|---|---|---|
| 2011/0029551 A1 | 2/2011 | Chen |
| 2018/0322168 A1 | 11/2018 | Levine et al. |

FOREIGN PATENT DOCUMENTS

| | | |
|---|---|---|
| EP | 3356937 B1 | 9/2019 |

OTHER PUBLICATIONS

Sang, Bo, et al. "Plasma: programmable elasticity for stateful cloud computing applications." Proceedings of the Fifteenth European Conference on Computer Systems. 2020. (Year: 2020).*
Heath, M. (Feb. 29, 2020). Durable functions upgrade strategies. Sound Code—Mark Heath's Blog. https://markheath.net/post/durable-functions-upgrade-strategies (Year: 202).*
International Search Report and Written Opinion dated Jun. 15, 2023 for PCT Application No. PCT/US2023/013692.
Cloudflare Docs; Using Durable Objects: https://developers.cloudflare.com/workers/learning/using-durable-objects.
Gillum et al, Azure, Jan. 14, 2022; What are Durable Functions https://docs.microsoft.com/en-us/azure/azure-functions/durable/durable-functions-overview?tabs=csharp.

* cited by examiner

*Primary Examiner* — William Spieler
(74) *Attorney, Agent, or Firm* — EIP US LLP

(57) ABSTRACT

A database system and a computer implemented method for managing functions in the database system is provided. The method, implemented using instructions that may be stored in the database system, involves obtaining first data representing a set of one or more operations to be performed on data in the database system. Second data, representing a function definition, is derived from the first data and the function definition includes the set of one or more operations and a set of state variables. A function is generated according to the second data. Generating the function includes storing a set of one or more values for respective ones of the state variables. The set of values are stored in an isolated computing environment in the database system and the function is configured to operate on the values in the isolated computing environment.

19 Claims, 13 Drawing Sheets

DURABLE FUNCTIONS IN DATABASE SYSTEMS

BACKGROUND OF THE INVENTION

Field of the Invention

The present application relates to database management systems, and more specifically, methods and systems for implementing functions in relational database management systems.

Description of the Related Technology

As technologies advance, the amount of information stored in electronic form, the desire for the real-time, or pseudo real-time, ability to search, organize, and/or manipulate such information is ever increasing. Database management systems, sometimes also referred to as database systems, databases, datastores, and data warehouses, organize data in a form that facilitates efficient search, retrieval, and/or manipulation of selected information. Typical database management systems allow a user to submit a "query" or call one or more functions in a query language for searching, organizing, retrieving, and/or manipulating information that satisfies particular conditions.

Certain databases may be transactional, which is to say their primary purpose is to record transactions. Such transactions may be thought of as one or more operations performed on data, which are recorded in logs. A log may comprise a continuous stream of log records, each of which corresponds to a transaction. This may allow transactions to be replayed or undone following an event such as a system crash. Certain databases may additionally, or alternatively, be analytical, which is to say their purpose is to execute queries and generate analytics on data stored in the database.

Demands on database systems may vary and to handle increased demand, database systems may be scaled up (and down) by increasing (and decreasing) the resources of an existing server by increasing (or decreasing) the memory or upgrading the CPUs. Scale-out database systems increase the capacity by adding new nodes, for example in the form of new machines, to the database system.

User defined workloads may be deployed to operate on data stored in a database. Implementing these workloads in a database system presents challenges when trying to allocate resources, managing the interaction between workloads, and maintaining data consistency and durability across the database system. It would be desirable to provide a system which is capable of flexibly and efficiently handling complex workloads which operate on data stored in a database for a plurality of users.

SUMMARY

According to a first aspect of the present disclosure there is provided a computer-implemented method for managing functions in a database system, the method comprising: obtaining first data representing a set of one or more operations to be performed on data in a database managed by a database system; deriving second data from the first data, the second data representing a function definition for implementation in the database system, wherein the function definition includes the set of operations and a set of one or more state variables; and generating a function according to the second data, wherein generating the function comprises storing a set of one or more values for respective ones of the state variables, wherein the set of values are stored in an isolated computing environment in the database system, and the function is configured to operate on the set of values in the isolated computing environment.

The computer-implemented method of the present disclosure aims to provide a method which enables functions to be implemented in a database system which can be readily paused, upgraded, and redeployed. In particular, providing a respective set of values in an isolated computing environment which are modifiable by the function allows the state and operating status of the function to be durably maintained. Other functions, or users, may be able to query these values to determine the state and operating status of the function, thereby allowing further functions or workloads to operate with and instruct the function in a way which maintains consistency and durability of the function and its associated values. These functions can be paused, for example, by first determining whether there are any active operations being implemented by the function, and subsequently issuing an instruction to cease performing operations. The function can also be redeployed in a different database system, or on a different set of computing resources, for example, by copying the function from one set of computing resources to another, and by transferring the set of values from the isolated computing environment to a different isolated computing environment on the different set of computing resources. Providing functions in this way enables these functions to be paused, updated, and redeployed effectively, allowing the database system to more easily manage computational resources, adhere to relevant jurisdictional data protection laws, and react quickly to user requests, such as updates and/or modifications to these functions. These functions may be durable in the sense that each respective set of values is durably maintained in an isolated environment, the values are operated on with durable transactability, and the functions can be redistributed and a redeployed within the database system in way which maintains consistency and the characteristics of the functions.

According to a second aspect of the present disclosure there is provided a database system for implementing one or more functions which are configured to operate on data stored in the database system, the database system comprising at least one processor; and storage comprising computer executable instructions which, when executed by the at least one processor, cause the at least one processor to: obtain first data representing a set of one or more operations to be performed on data in a database managed by a database system; derive second data from the first data, the second data representing a function definition for implementation in the database system, wherein the function definition includes the set of operations and a set of one or more state variables; and generate a function according to the second data, wherein generating the function comprises storing a set of one or more values for respective ones of the state variables, wherein the set of values are stored in an isolated computing environment in the database system, the function being configured to operate on the set of values in the isolated computing environment.

According to a third aspect of the present disclosure there is provided a non-transitory computer-readable storage medium comprising computer executable instructions which, when executed by at least one processor, cause the at least one processor to: obtain first data representing a set of one or more operations to be performed on data in a database managed by a database system; derive second data from the first data, the second data representing a function definition for implementation in the database system, wherein the function definition includes the set of operations and a set of one or more state variables; and generate a function according to the second data, wherein generating the function comprises storing a set of one or more values for respective ones of the state variables, wherein the set of values are stored in an isolated computing environment in the database system, the function being configured to operate on the set of values in the isolated computing environment.

DETAILED DESCRIPTION OF CERTAIN INVENTIVE EMBODIMENTS

Figure 1:
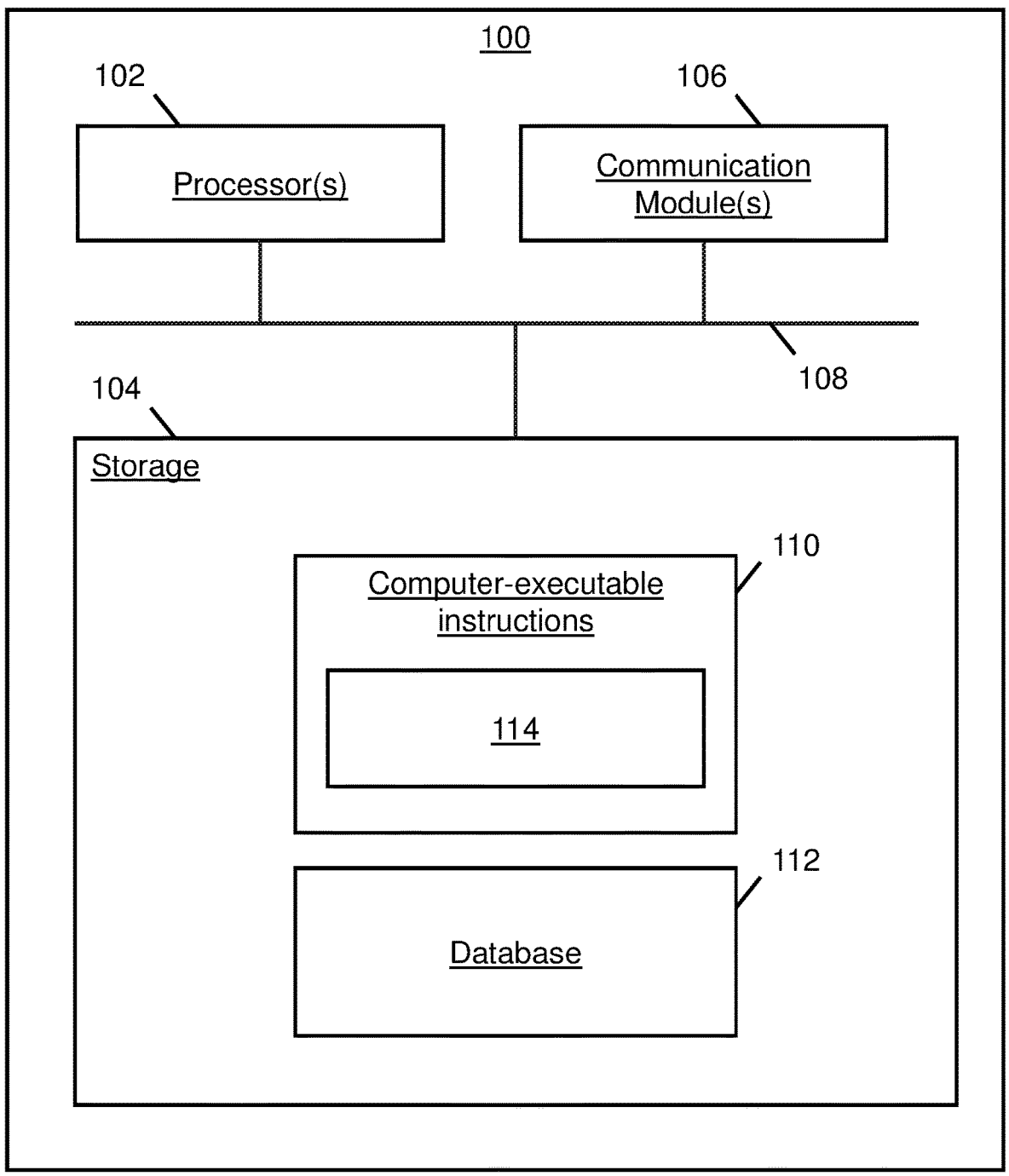
FIG. 1 is a schematic diagram showing a database system implementing an instance of a database according to examples.

Details of systems and methods according to examples will become apparent from the following description, with reference to the Figures. This description includes numerous specific details of certain examples for the purpose of explanation. Reference in the specification to "an example" or similar language means that a particular feature, structure, or characteristics described in connection with the example is included in at least that one example, but not necessarily other examples. It should be further noted that certain examples are described schematically with certain features omitted and/or necessarily simplified for ease of explanation and understanding of the concepts underlying the examples.

A database may generally be considered as an organized collection of data stored electronically in a computer system. The computer systems which store and manage databases and the data stored therein are commonly referred to as database management systems, or database systems. As well as storing databases, database systems may also be configured to perform certain management functions such as replicating the databases to provide resiliency to crashes and performing operations to record new data in the database and/or to modify data already stored in the database. Some database management systems may also provide an interface to enable users to implement workloads which are configured to perform operations on data stored in the database.

Workloads are typically computer programs or applications which are configured to perform one or more operations. In some cases, workloads may be simple, for example, a workload may be a very specific program for performing one or more operations, such as reading, writing, or otherwise modifying data in a database system. Alternatively, workloads can be complex programs which are configured to implement many functions, each function being configured to perform one or more low level operations on data stored in the database. For example, a simple workload may be a program which is configured to go through a database and modify a single data value type for a plurality of entries in the database. An example of a more complex workload may be a program written to manage and perform analysis on data for a large number of clients, or users, whose data is stored in a database. A complex workload such as this may include functions for monitoring the status of each client whose data is stored in the database, functions which are configured to run analysis on client's data in the database, and functions which are configured to manage the implementation of other functions in the database system to ensure concurrency, consistency, and efficient distribution of computing resources in the database system.

In general, workloads which are configured to perform operations on data stored in a database may be implemented on computing resources which are separate to the database system and may use an interface provided by the database system to access data stored in the database. Alternatively, these workloads may be deployed within these database systems. As technologies advance, the amount of data stored in databases and the complexity of workloads operating on this data is ever increasing.

Complex workloads, such as workloads which perform machine learning and artificial intelligence operations, can be long running and may compete for computing resources with other workloads. Additionally, these workloads may need to be retrained, and redeployed, either within the same database system or to other database systems. The long running nature of these workloads present challenges when attempting to pause, redeploy, and modify these workloads. Long running workloads are generally very computationally expensive to start from scratch, can lose valuable data generated during the operation of the workload when being paused or canceled, and/or can fail to adequately process real-time or pseudo real-time events that the database system is configured to analyze and transact. Pseudo real-time events may generally be events which logically appear to occur in real-time in a computer system although, may be related to events which, temporally, occur asynchronously.

Certain examples described herein aim to provide a database system and methods for managing functions in a database system which enable functions to be more easily paused, redeployed, updated, and monitored. The functions described herein are provided with the ability to control and modify respective values which correspond to state variables defined in the function. These values are isolated in the database system such that they are protected from being modified by other functions. Isolating these values simplifies the management of these functions by making it easier to identify the state of the function and to copy or move the function between computing resources in the database system.

FIG. 1 shows a database system 100 comprising a set of one or more processors 102, storage 104, and one or more communications modules 106. The processor(s) 102, storage 104, and communications module(s) 106 are connected over an interface 108, for example, a bus. The processor(s) 102 includes any suitable combination of processing circuitry which is configurable to perform the functions described herein with reference to FIGS. 2 to 12. For example, the processor(s) 102 may include central processing units (CPUs), graphics processing units (GPUs), neural processing units (NPUs), field programmable gate arrays (FPGAs), application specific integrated circuits (ASICs), fixed function processing circuitry, any other suitable processing circuitry, and/or any combination of these.

The storage 104 may include a combination of volatile storage, or memory, and non-volatile storage, which may be referred to as disk storage. The volatile storage may include a combination of random access memory (RAM), static random-access memory (SRAM), and/or types of dynamic random-access memory (DRAM). While the volatile storage has been described in relation to the storage 104 in some cases, part or all of the volatile storage may be directly attached to or integrated with the processor(s) 102.

Non-volatile storage, while sometimes being referred to as "a disk" or "disk storage", may include any suitable combination of non-volatile storage types. For example, the non-volatile storage may include hard disk drives, solid state drives, flash memory, magnetic tape storage, or any combination of these storage types. In some cases, the non-volatile storage may include hierarchical storage, in which different storage types are used to store data according to a respective age and/or frequency of access of the data. For example, solid state drives may be used to store data which is frequently accessed, or which is likely to be accessed frequently. While hard disk drives, or tape storage, which have a higher read/write latency than solid state drives or flash memory may be used to store data which is older or less likely to be accessed frequently.

The storage 104 is used to store computer executable instructions 110, and a database 112. The computer-executable instructions 110, when executed by the processor(s) 102 may implement one or more programs. These programs may include general database management programs for maintaining data in the database 112, performing backup and replication processes, providing an interface to the database 112, and so forth. The computer-executable instructions 110 may also include instructions for implementing user defined workloads. The database 112 included in the storage 104 may include a collection of structured data in the form of a combination of row store format and column store format data, as well as collections of unstructured data such as binary large objects.

The communications module(s) 106 may include any suitable combination of network enabled communications modules and/or user interfaces. For example, the communications module(s) 106 may include network interfaces to enable the database system 100 to communicate with one or more further computer systems over a network such as a local area network, a wide area network such as the internet, and so forth. The communications module(s) 106 may alternatively, or additionally, include user interfaces such as input and output devices such as a screens, keyboards, touch screens and so forth.

While the database system 100 is shown in FIG. 1 as being a single device, it will be appreciated that the database system 100 may comprise a collection of separate computing systems. For example, the database system 100 may be implemented on one or more collocated servers, or cluster computers. Alternatively, the database system 100 may be a distributed database system, being implemented as a plurality of computer, or servers, located remotely from one another and communicatively coupled over a network.

The computer-executable instructions 110 include a set of instructions 114 which, when executed by the processor(s) 102 cause the database system 100 to perform a computer-implemented method 200 for managing functions in a database system 100 shown in FIG. 2 and which will be described further below in relation to FIGS. 2 to 12.

Figure 2:
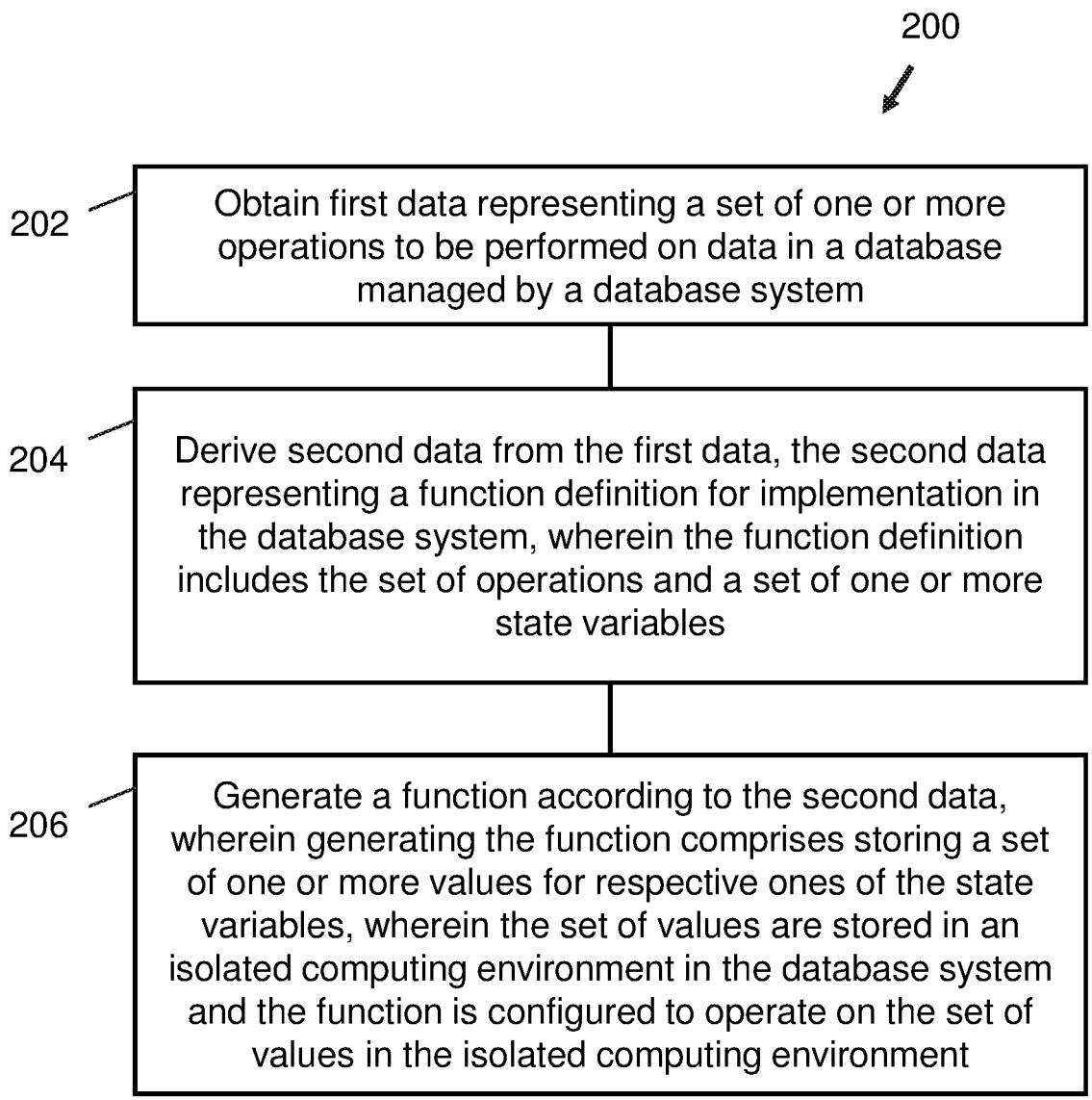
FIG. 2 is a flow chart showing a method according to examples.
Figure 3:
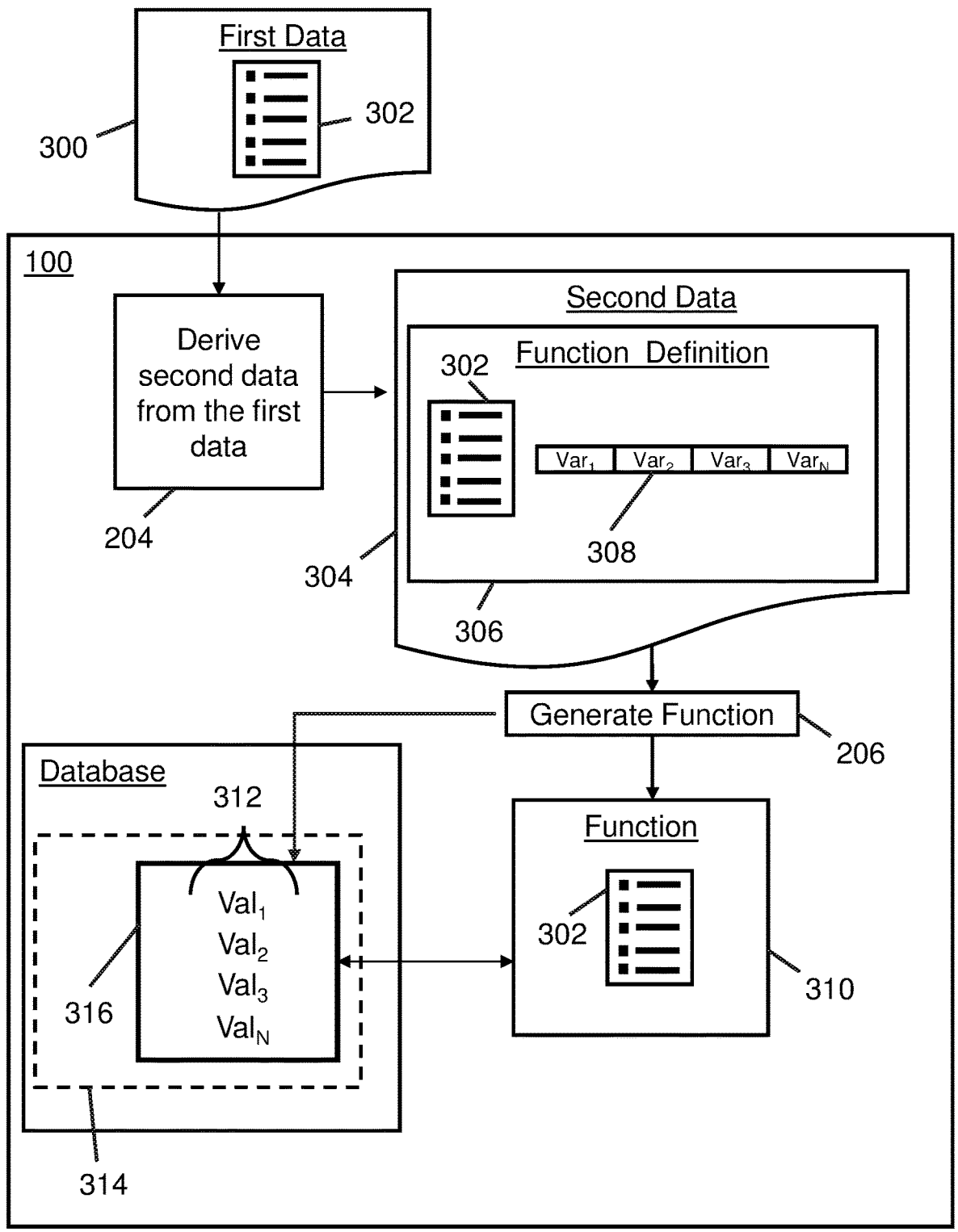
FIG. 3 is a schematic diagram illustrating a database system implementing the method shown in FIG. 2 and according to examples.

Referring to FIGS. 2 and 3, method 200 comprises obtaining 202 first data 300 representing a set of one or more operations 302 to be performed on data in a database 112 managed by a database system 100. Obtaining 202 the first data 300 may include receiving the first data 300 over the one or more communications modules 106. For example, the first data 300 may be received over a network from a user operating a terminal or external computing device which is configured to interface with the database system 100. A user may write a program in a high-level computer programming language, such as Python, or Java, C++, and so forth, and upload this program to the database system 100 via the communications module(s) 106.

Alternatively, the first data 300 may alternatively be distributed by a centralized management system which is configured to distribute first data 300 to one or more database systems 100. For example, the first data 300 may represent a set of one or more operations 302 which are to be implemented in a variety of different database systems which are provided and/or managed by a centralized database management service.

In other examples, obtaining 202 the first data 300 may include reading the first data 300 from storage 104, such as non-volatile storage, in the database system 100. Where the database system 100 comprises a user interface, a developer environment may be provided in the database system 100 allowing users to write programs, including writing a program represented by the first data 300, directly in the database system 100. This first data 300 may be written into storage 104 and obtained 202 from the storage when the method 200 is implemented.

Second data 304 representing a function definition 306 for implementation in the database system 100 is derived 204 from the first data 300. The function definition 306 represents information which is used to create specific instances of the function in the database system 100. Instances of the function definition 306 are generally referred to as functions. The function definition 306 includes the set of operations 302 and a set of one or more state variables 308.

As described above, the set of operations 302 may include low level operations to be performed to data in the database, such as reading, writing, and/or otherwise modifying the data. These operations 302 may also include more sophisticated operations which each involve reading multiple data values from the database, operating on and/or with these data values and storing results in the database.

The set of one or more state variables 308 represent variables which are used to define each instance of the function generated from the function definition 306 and may represent the data on which the operations in the function are configured to operate. The set of state variables 308 in the function definition 306 may be implemented as part of a schema which defines the set of state variables 308 and a data structure within which the state variables 308 are implemented and mapped.

By way of illustration, one implementation of a function definition 306 may be where a company uses the function definition 306 to establish a system for managing client's data and lifecycle in the database system 100. According to this example, the set of one or more state variables 308 may represent data associated with an individual, such as age, height, location, a subscription type, and so forth. The set of operations 302 in this case could represent operations for example to modify these data, to make predictions regarding the individual based on these data, or to cause certain operations or events to be performed in response to certain conditions being represented by the individual's data.

Deriving the second data 304 may in some cases include processing the first data 300 and/or converting the data into a format which is suitable for implementation in the database system 100. As described above, the first data 300 may represent a program written by a developer, the program including the set of operations 302. The developer may write this program in a language of their choosing, for example, in a high-level computing language such as Python, C++, Java, and the like. Where the database system 100 is configured to implement such languages, deriving 204 the second data 304 may be a simple operation to copy, move, and or compile the first data 300 such that it can be implemented in the database system 100. In other examples, deriving 204 the second data 304 may be a more complicated process involving identifying the set of operations 302, any associated variables, and generating a function definition 306 which is suitable for implementing in the database system 100, for example written in a language and/or using data structures which are suitable for the database system 100.

A function 310 is generated 206 according to the second data 304; this may involve storing a set of one or more values 312 for respective ones of the state variables 308. The set of values 312 may be data values on which the one or more operations 302 may be performed. For example, the set of values 312 may be user data relating to users of the database system 100, or their clients.

In FIG. 3 the set of values 312 are each represented with a subscript numeral which corresponds to a subscript numeral of the respective variable 308. Generating 206 the function 310 may be triggered by a request to generate a new function 310. In the request to generate 206 a new function 310, an initial set of values 312, each relating to a respective state variable 308, may be provided. Taking the example provided above in which the function definition 306 defines a function 310 which stores, manages, and controls an individual's data and lifecycle, the request to generate a function 310 may be triggered when e.g. a new customer signs up to the services provided by the company. The customer would provide an initial set of values including their age, height, location, and a selected subscription type. A function 310, associated with this customer, may then be generated 206 and these values 312 are stored.

In preferred arrangements the set of values 312 are stored in an isolated computing environment 314 in the database system 100 and the function 310 is configured to operate on the set of values 312 in the isolated computing environment 314. This prevents the set of values 312 from being modified by functions which are not authorized to do so and/or on the request of an unauthorized user. By restricting the ability to operate on and/or modify the set of values 312 to the function 310, the durability and consistency of the set of values 312 can be maintained.

Further, by simplifying the number of functions which are able to modify the set of values 312, it becomes easier to move or modify the set of values 312 and the function 310 to a different set of computing resources in the database system 100 while ensuring that they are not actively being operated on, which might otherwise cause errors or data corruption.

The function 310 may be configured to operate on the set of values 312 in a way which maintains characteristics such as atomicity, consistency, isolation, and durability (ACID) so that the integrity and transactability of the set of values 312 are maintained. For example, operations may be performed by the function in units of compute referred to as transactions, which are atomic in the database system 100. A transaction may involve one or more low level operations. When performing a transaction, the individual operations included in the transaction may be performed logically, in memory, and only persisted to disk when the full transaction has been completed, making the operations permanent in the database system 100. Persisting the transaction to disk, and performing adequate backup procedures, may ensure durability in the database system 100. Once a transaction is completed it is said to be committed in the database system 100. As the set of values 312 are only operated on by transactions performed by the function 310, the transactions are isolated, meaning that the set of values 312 may not be subjected to two or more operations at the same time. Isolation and consistency may also be supported by configuring the function 310 to perform operations asynchronously, which will be described further below with reference to FIG. 7.

The set of values 312 may be configured to allow one or more further functions in the database system 100 to query the set of values 312 such that these further functions are able to read the values 312 but cannot perform operations on or modify the set of values 312. In this way, it is possible for other functions in the database system 100 to monitor the set of values 312 associated with the function 310 while also ensuring that the permission to modify these values 312 is restricted thereby simplifying the management of the set of values 312 in the database system 100 and enabling the system to maintain the ACID characteristics described above.

The set of values 312 may be stored in a relational data table, referred to as a state table 316, which is able to be queried using appropriate computing instructions. The data structure and mapping of the state table 316 used to store the set of values 312 may be defined in the function definition 306 as the state variables 308. Where the set of values 312 are stored in a state table 316, the values can be queried by suitably authorized functions and/or systems, for example, using structured query language (SQL).

The isolated computing environment 314 may be implemented in a number of ways. In a first example, the isolated computing environment 314 is implemented using a private table, e.g. the state table 316 may be a private table. The function 310 may be configured with authorization to modify the set of values 312 stored in the private table. For example, the private table may require a key, or other type of identification, to be presented before allowing values stored therein to be processed or modified. The function 310 may be configured with this key or other type of identification. Where the isolated computing environment 314 is implemented using a private table, the table may be stored in a database comprising a plurality of private tables each associated with a respective function.

In a second example, the isolated computing environment 314 is implemented using a virtual machine. The function 310 may be configured to interface with the virtual machine and/or may be implemented using the same virtual machine on which the values 312 are stored. In other examples, the set of values 312 may be logically isolated in the database system such that only the function 310 has information, such as a schema, needed to locate the set of values 312 in order to operate on and/or modify them.

Storing the set of values 312 in an isolated computing environment 314 and configuring the function 310 to operate on the set of values 312 in the isolated computing environment may involve providing the function 310 with control over the set of values 312. This control may be exclusive such that the function 310 has sole authority to modify the set of values 312 in the isolated computing environment 314.

By storing a set of values 312 in an isolated computing environment 314 and configuring the function 310 to operate on the set of values 312, control over the set of values 312 may be simplified. Providing a system in which only the function 310, or otherwise authorized functions, which is associated with the set of values 312 is able to operate on them makes it possible to determine the current state of the function and its associated values quickly and consistently. This is because it is neither necessary to query a set of data values which are distributed in tables throughout the database, nor necessary to confirm that any other functions which have access to the set of data values 312 are actively operating on these values 312.

Simplifying the access and control over the set of values 312 which are relevant to the function 310 in this way makes it possible to quickly pause, modify, redeploy, and/or redistribute the function 310 within the database system 100 without having to manage other functions which may otherwise be concurrently operating on the set of values 312.

The function 310 shown in FIG. 3 includes the set of operations 302 as defined in the function definition 306. However, it will be appreciated that including the set of operations 302 may involve storing a reference to the set of operations 302 in the function 310. When performing one of the operations 302 the function 310 may call the operation from the function definition 306 and provide values and/or references to values when calling the operation.

At least one of the set of operations 302 may be configured to update one or more of the set of values 312 stored in the isolated computing environment 314. In this way the function 310 provides a way to update the set of values 312. Other functions which need to modify the set of one or more values 312 may do so using an operation provided in the function 310. Users, or other functions which are separate to the function 310 may send a request to the function 310, in order to update the set of values 312.

Figure 4:
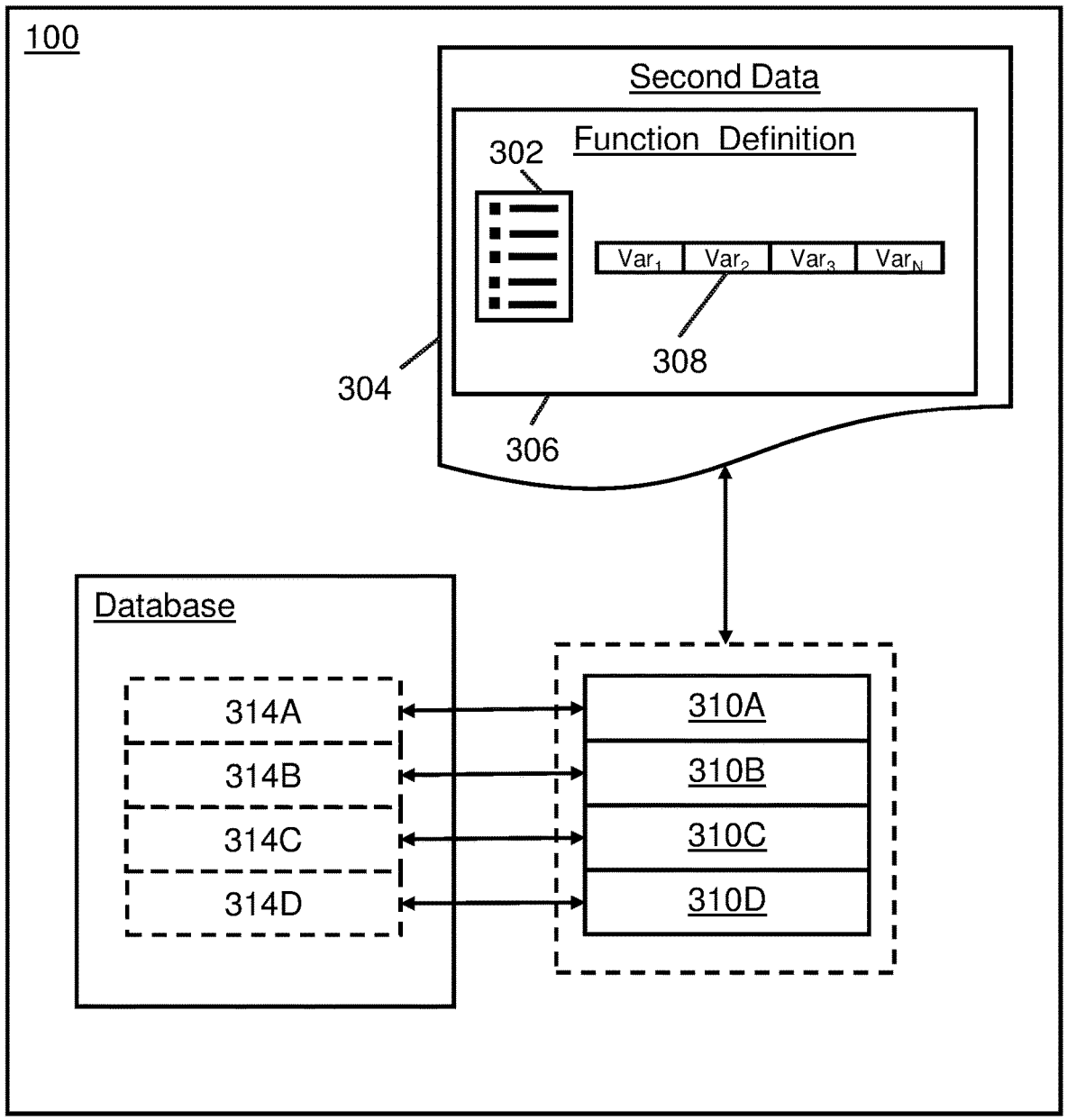
FIG. 4 is a schematic diagram showing a database system comprising a plurality of functions according to examples.

FIG. 4 shows an example of the database system 100 in which the method 200 has been performed and the database system 100 comprises a plurality of functions 310A to 310D each of which is configured to operate on a respective set of values stored in respective isolated computing environments 314A to 314D. As described above, these isolated computing environments 314A to 314D may be private tables in a database, isolated physical computing resources in the database, and/or isolated virtual machines in the database system 100. Each of the functions 310A to 310D may include a reference to the function definition 306 from which they are generated. In this way, changes to the function definition 306 may be correlated to the functions 310A to 310D. Further, it becomes possible to readily identify the set of operations 302 and the state variables 308 which are associated with the functions 310A to 310D. Each of the functions 310A to 310D may comprise a respective unique identification number, or ID, allowing the function 310A to 310D to be referenced, called, or queried by other functions operating in the database system 100.

Figure 5:
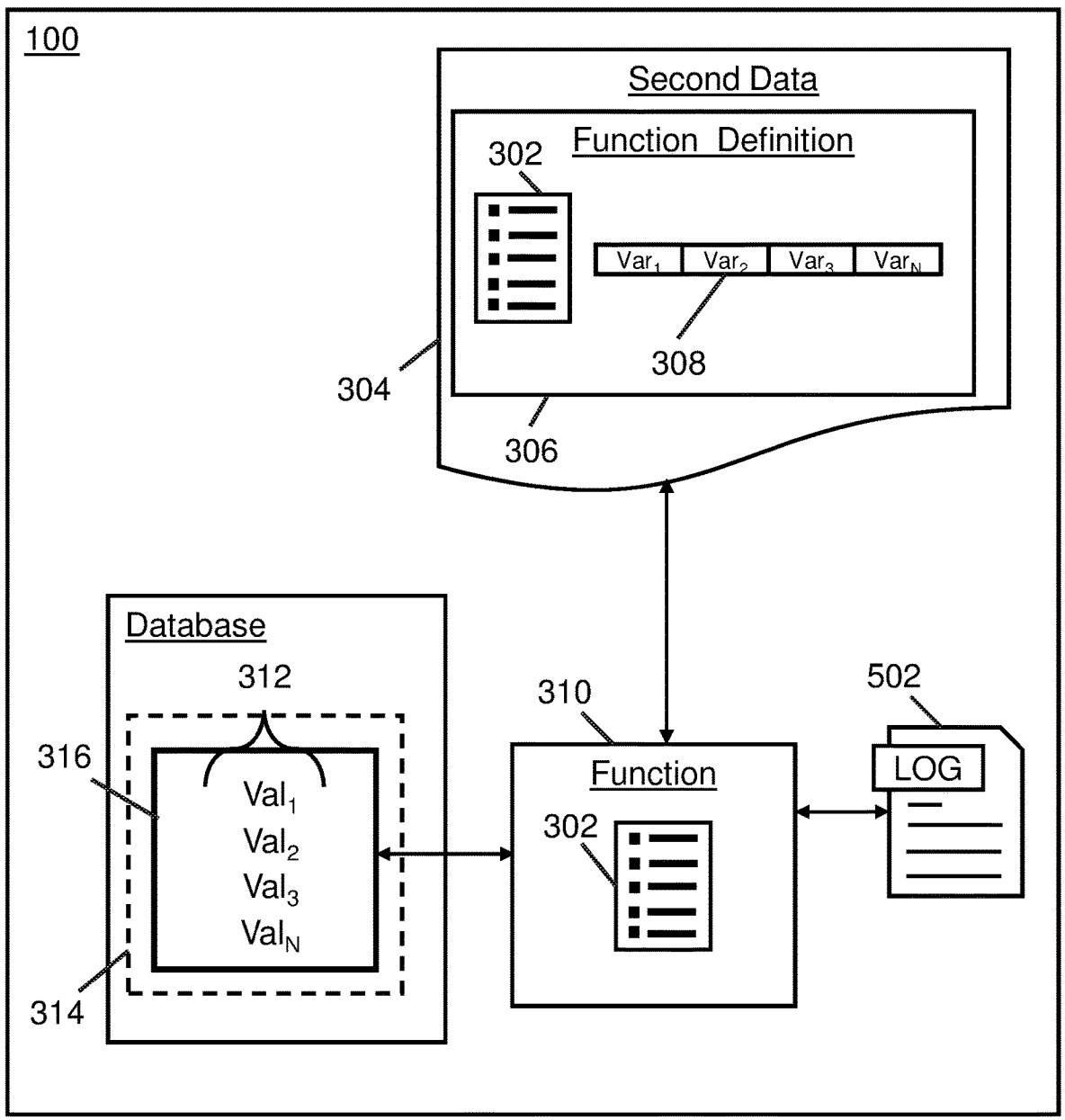
FIG. 5 is a schematic diagram showing a database management system comprising an execution log according to examples.

The method 200 may involve storing an execution log 502, as shown in the example of FIG. 5, comprising data indicative of operations 302 having been performed by the function 310. The function 310 may be configured to write data to the execution log 502 that is indicative of operations which are performed by the function 310, for example in the form of log records. Each log record may store data representing a specific operation, or unit of compute. By storing records of the operations 302 performed by the function 310 it becomes possible to monitor past and ongoing operations performed by the function 310 and to identify whether operations have been successfully performed by the function 310, and/or whether the operation requires attention from an administrator. An administrator in this context may be a user who is actively monitoring the database system 100 and/or an automated function configured to identify errors, or stalled operations and to act accordingly to mitigate and/or correct these occurrences in the database system 100.

In some examples, the execution log 502 used to store data indicative of operations performed by the function 310 may be unique to the function 310. That is to say that the execution log 502 may only record operations performed by the function 310 and may not include data indicative of operations performed by other functions in the database system 100. Alternatively, the execution log 502 may be used to store data indicative of operations performed by a plurality of functions 310A to 310D which are implemented in the database system 100. In this case, the execution log 502 may be used to store data indicative of operations performed by all functions 310A to 310D in the database system 100 or to store data indicative of operations performed by a subset of functions 310A to 310D implemented in the database system 100. The subset of functions 310A to 310D may include functions of the same type and/or functions 310A to 310D associated with the same respective function definition 306.

Figure 6:
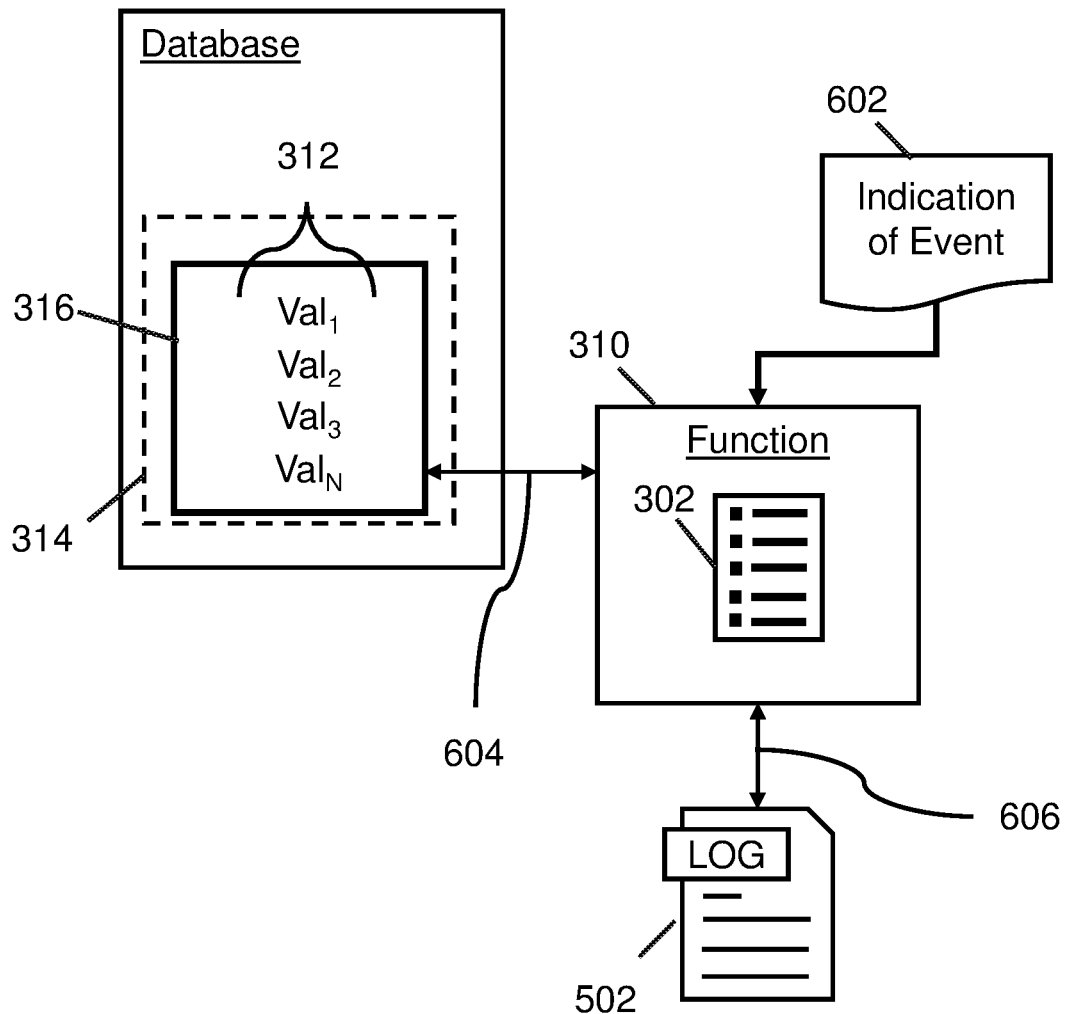
FIG. 6 is a schematic diagram showing a function configured to react to an event according to examples.

Operations 302 defined in the function 310 may be event-driven, which is to say that operations 302 may be called by the function 310 in response to events. To this end, each operation may be associated with one or more events, such that following an event a respective operation can be identified to be performed. FIG. 6 shows an example in which the method 200 involves configuring the function 310 to obtain an indication of an event 602 and, in response to the indication 602, perform at least one associated operation. Each operation may be associated with a respective event ID which may correspond to an event ID included in the indication 602.

On completion, the operation generates an output. The output may include data used to modify 604 one or more of the set of values 312 and/or data which is provided to one or more further functions. For example, the output of an operation performed by the function 310 may be an event which causes a further function, not shown in FIG. 6, to perform a further operation.

The operation performed by the function 310 in response to the indication 602 may be recorded 606 in the execution log 502 by writing data indicative of the operation in the execution log 502. The data written to the execution log 502 may include any one or more of an indication of the operation which is performed, an indication of whether the operation is successfully performed, an indication of an output of the operation, and/or an indication of the event associated with the operation. Writing data to the execution log 502 representing the successful or unsuccessful performance of the operation makes it possible to easily identify whether an operation has completed, is ongoing, is waiting for an input, and/or is competing for resources in the database system 100 and is unable to be completed.

Data indicative of one or more events which occur in the database system 100 may also be stored in the execution log 502. For example, when an indication 602 of an event is obtained by a function the execution log 502 may be updated with data indicative of this event. By storing data indicative of operations performed by the function 310 and data indicative of the events which occur in the database system 100 it becomes possible to identify where an operation, which is expected to be performed in response to a given event, is not successfully called and/or does not successfully complete. This can be used to identify where a function 310 is struggling to compete for computational resources to implement a given operation. As well as records of operations and events, the execution log 502 may be used to store further metadata associated with the function 310 for diagnostic and analytical purposes. General signal traffic and communications sent to and from the operation may also be stored in the execution log 502 which can be reviewed by an administrator to tune or otherwise reconfigure the database system 100.

The aforementioned events may include any one or more of an input from a user, an instruction from one or more further functions operating in the database system 100, an output from one or more further functions operating in the database system 100, or an output from another operation performed by the function 310.

Inputs from a user may include a user providing an instruction, over a user interface and/or the communications module(s) 106, to the function 310 to perform one or more operations of the set of operations 302. The database system 100 may convert the input from the user into an indication of an event 602, for example, including a relevant event ID which can be used to identify which of the operations 302 to perform in response to the event and, if applicable, input data to be used when performing one of the set of operations 302.

Some functions 310 may include operations 302 which are dependent on calling one or more further operations either included in the same function 310 or in other functions in the database system 100. For example, where the function 310 relates to managing the data and lifecycle of a particular individual, one of the operations of the set of operations 302 may involve generating a prediction of one or more values associated with the individual at some future point in time. In this case, generating a prediction may require one or more further functions operating in the database system 100 to provide an output which is used in generating the prediction for the individual associated with the function 310. The function 310 may send an indication of an event, representing a request for a specific output, to one or more further functions in the database system 100 which in turn is used by these one or more further functions to identify and perform a respective operation. On completion an output from this operation is returned to the function 310 allowing it to complete its prediction.

As described above, the output of an operation from within the function 310 or from a further function in the database system 100 can serve as an event causing one or more further operations to be performed by the function 310. In this way, operations 302 and/or functions 310 may be nested in the database system 100 meaning that operations 302 may wait for the output of one or more further operations to be completed before completing. This allows complex operations, which might otherwise be implemented as multi-threaded programs to instead be implemented in a linear fashion using a single thread in the database system 100, as will now be explained.

Figure 7:
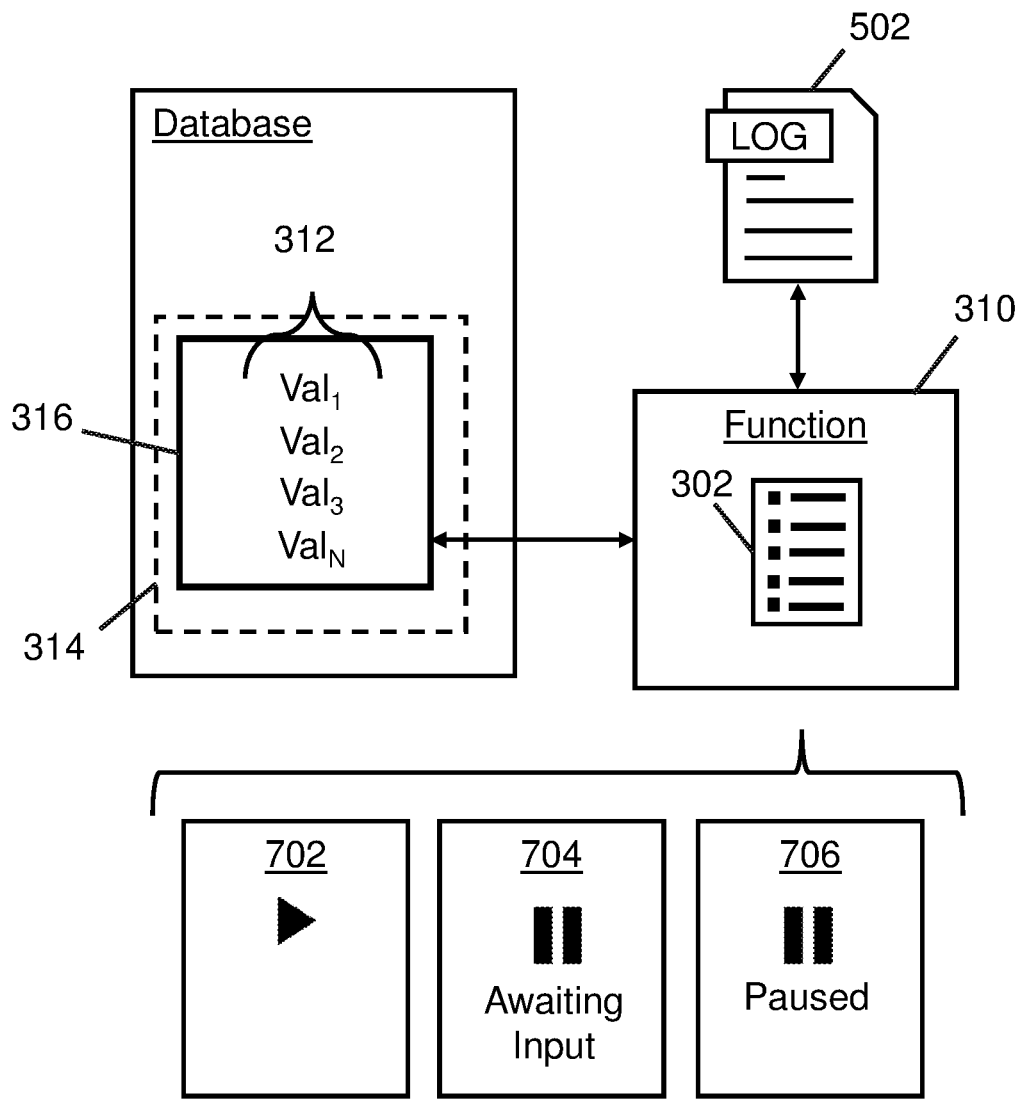
FIG. 7 is a schematic diagram showing a function performing a plurality of operations according to examples.

The function 310, and other functions 310A to 310D generated according to the second data 304, may be configured to perform operations asynchronously, as shown in FIG. 7. This means functions can readily be paused, updated, and redeployed. In the example illustrated in FIG. 7 there are several active operations 702, 704, and 706 but only one operation is processed at any one time. For example, several events may occur in the database system 100 causing the function 310 to start performing respective operations 702, 704, and 706. In some instances, none of the respective operations 702, 704, and 706 may have priority over the other operations 702, 704, and 706 and so the function 310 may process the operations 702, 704, and 706 on a first come first serve basis, wherein the operation 702 corresponding to the first indication of an event which is received by the function 310 is performed first. The other operations 704, 706 may be paused while the first operation 702 is being performed. In some instances, an operation 704 will not be able to be completed until an input from another operation is received, or until certain data is made available to the operation 704. Where this is the case, the operation 704 may be paused until the input is received. While the operation 704 is paused, the function 310 may continue with performing another one of the active operations 706. Using single-threaded processes in the database system 100 in this manner simplifies the implementation of functions 310 in the database system 100 and enables the database system 100 to cancel or pause operations when redeploying or upgrading the function 310 while mitigating any potential errors which would otherwise affect the consistency and/or durability of the set of values 312.

Alternatively, performing operations 302 asynchronously may include only having one operation active at any one time and queuing further operations which are to be activated on completion of a present operation.

Figure 8:
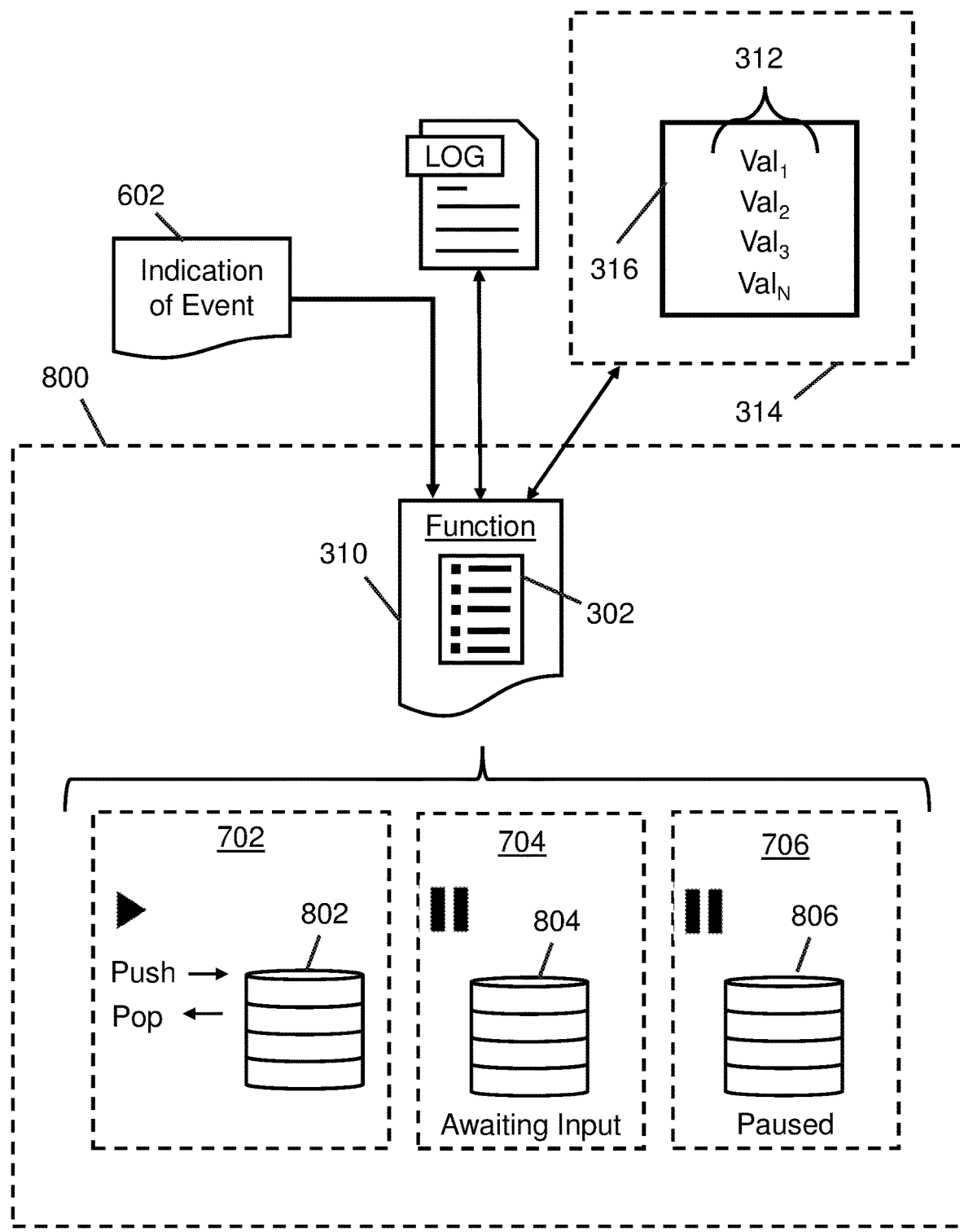
FIG. 8 is a schematic diagram showing a function implemented using a stack based virtual machine according to examples.

Referring to FIG. 8, function 310 may be implemented using a stack-based virtual machine 800, which is to say a virtual machine which processes data using an interaction which involves using push and pull operations to move short-lived temporary values to and from a push down stack according to a last in first out data structure. In this case the method 200 may involve configuring the function 310 to create a stack 802 in response to obtaining the indication of the event 602, performing the operation 702 using the stack 802, and, in response to the operation 702 generating an output, deleting the stack 802. In this way, each stack 802, 804, 806 may correspond to a respective operation 702, 704, 706 performed by the function 310.

Using stacks 802, 804, 806 to implement each operation 702, 704, 706 means that where an operation 704 is paused, the respective stack 804 maintains a current status of the operation, allowing it to be easily resumed from where the operation 704 left off. Stacks 802, 804, 806 may also be implemented using contiguous blocks of memory, thereby simplifying the read and write procedure when processing data using a stack. As such, monitoring, pausing, and redeploying functions 310 which are actively performing operations 702 to 706 is simplified as the progress of operations 702 to 706 can be easily identified and copied from the stacks 802 to 806.

In some examples, the function 310 may be implemented using a linear memory model. A linear memory model is a memory addressing technique in which memory is organized in a single contiguous address space. This single contiguous address space may be a physical storage space or may be implemented using virtualized memory. Using a linear memory model to implement a function 310 means that while processing operations in the function 310 it becomes possible to access memory locations directly as well as linearly. Using a linear memory model also enables the database system 100 to easily identify and collect memory used to implement the function 310, which is useful when migrating and updating the function 310 as will be described below in relation to FIGS. 9 to 12.

Figure 9:
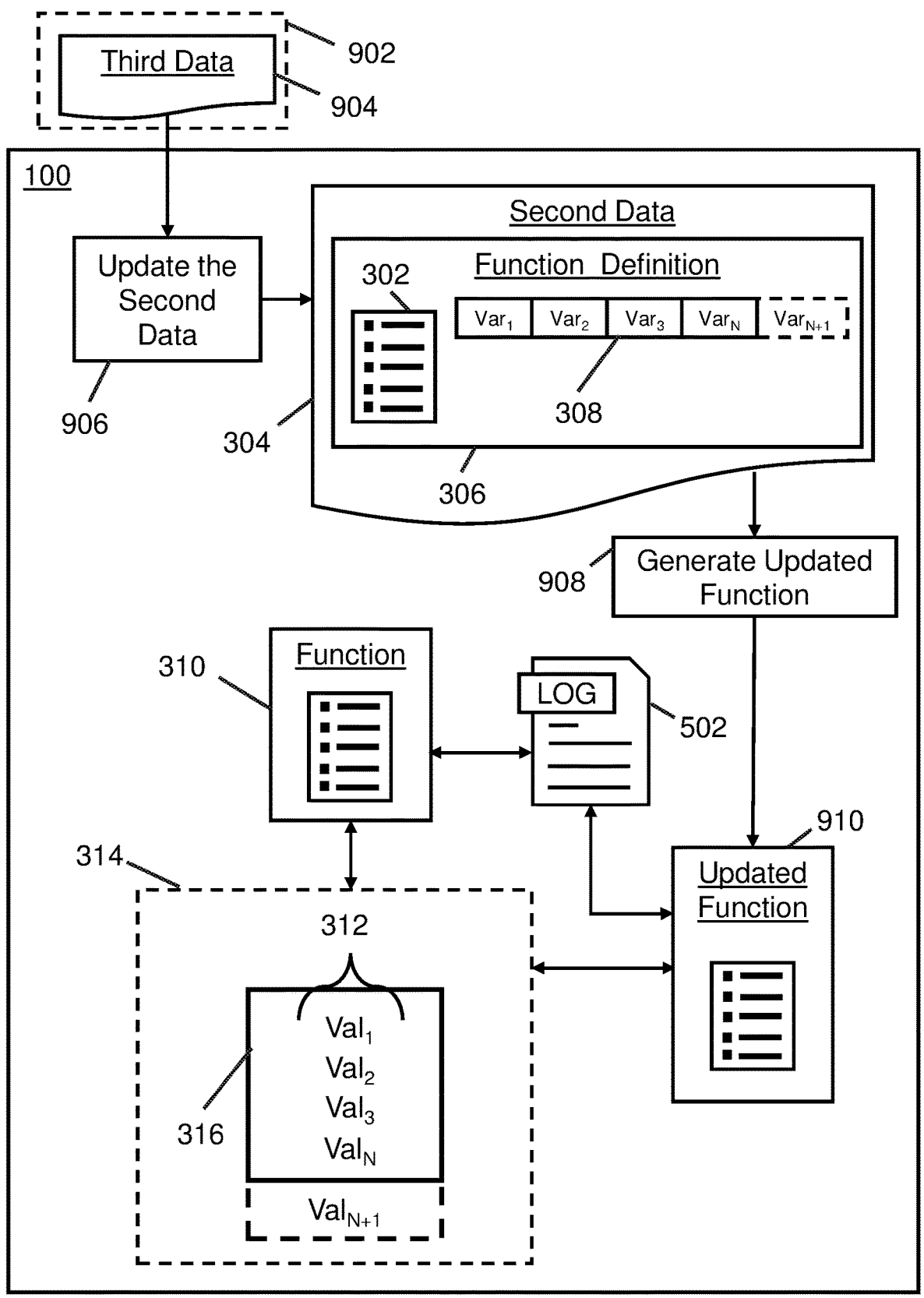
FIG. 9 is a schematic diagram showing an update to a function being performed according to examples.

Turning to FIG. 9, the method 200 may comprise obtaining a request 902 to update the function definition 306. The request 902 may include third data 904 representing an update to be performed to the function definition 306. The update that is to be performed to the function definition 306 may include modifying the set of operations 302 in the function definition 306, such as adding a new operation, deleting an operation, and/or otherwise modifying one of the set of operations 302. Alternatively, or additionally, the update may include modifying the set of state variables 308, such as by adding a new state variable $Var_{N+1}$, deleting a state variable, and/or otherwise modifying the state variable or a data structure, or schema, defining a relation between the set of state variables 308.

The request 902 to update the function definition 306 may be provided by a user. For example, a user may update a program, from which the function definition 306 is derived, and may upload the updated program to the database system 100 to cause the database system 100 to modify the function definition 306 accordingly. Alternatively, the request to update 902 the function definition 306 may be automatically generated in the database system 100.

The second data 304 is then updated 906 based on the third data 904. That is to say that the second data 304 may be modified according to the update represented by the third data including, for example, modifying the set of state variables 308, the set of one or more operations 302, and/or modifying metadata associated with the function definition 306. An updated function 910 is then generated 908 according to the updated second data 304. When generating the updated function 910, the updated function 910 may be provisioned with a reference to the set of values 312 that are associated with the original function 310. The updated function 910 may then be configured to operate on the set of values 312 stored in the isolated computing environment 314.

In this way, the function 310 may be updated by creating a new updated function 910 and transferring control of the set of values 312 to this updated function 910. This allows the function 310 to be updated seamlessly while mitigating the amount of down time which would otherwise occur if the function 310 had to be taken offline before being updated. After the updated function 910 is generated and configured to operate on the set of values 312, the original function 310 may be instructed to shut down and transfer control of the set of values 312 over to the updated function 910. The updated function 910 may be provided with an ID which is associated with an ID of the original function 310 and/or which is derived from the ID of the original function 310 such that a relation to the original function 310 can be maintained in metadata.

Where the updated function 910 is associated with a different ID to the original function 310, generating the updated function 910 may also involve updating metadata comprising an ID for the original function 310 by replacing this ID with an ID associated with the updated function 910.

As described above in relation to FIG. 3, the set of values 312 may be stored in a state table 316. Where the set of values 312 are stored in a state table 316, and the update includes modifying the state variables 308 associated with the function definition 306, generating the updated function 910 may involve modifying the state table 316. The state table 316 may be modified to account for modifications made to the state variables 308 in the function definition 306. As described above, updating the state variables 308 may include adding state variables, removing state variables, and/or otherwise modifying the set of state variables 308. Modifying the state table 316 may involve extending the state table 316, to account for additional values corresponding to additional state variables 308 in the updated function definition 306, deleting portions of the state table 316 to account for the removal of state variables in the updated function definition 306, and/or otherwise modifying the data structure or mapping of the state table 316 to address the changes made to the state variables 308.

Figure 10:
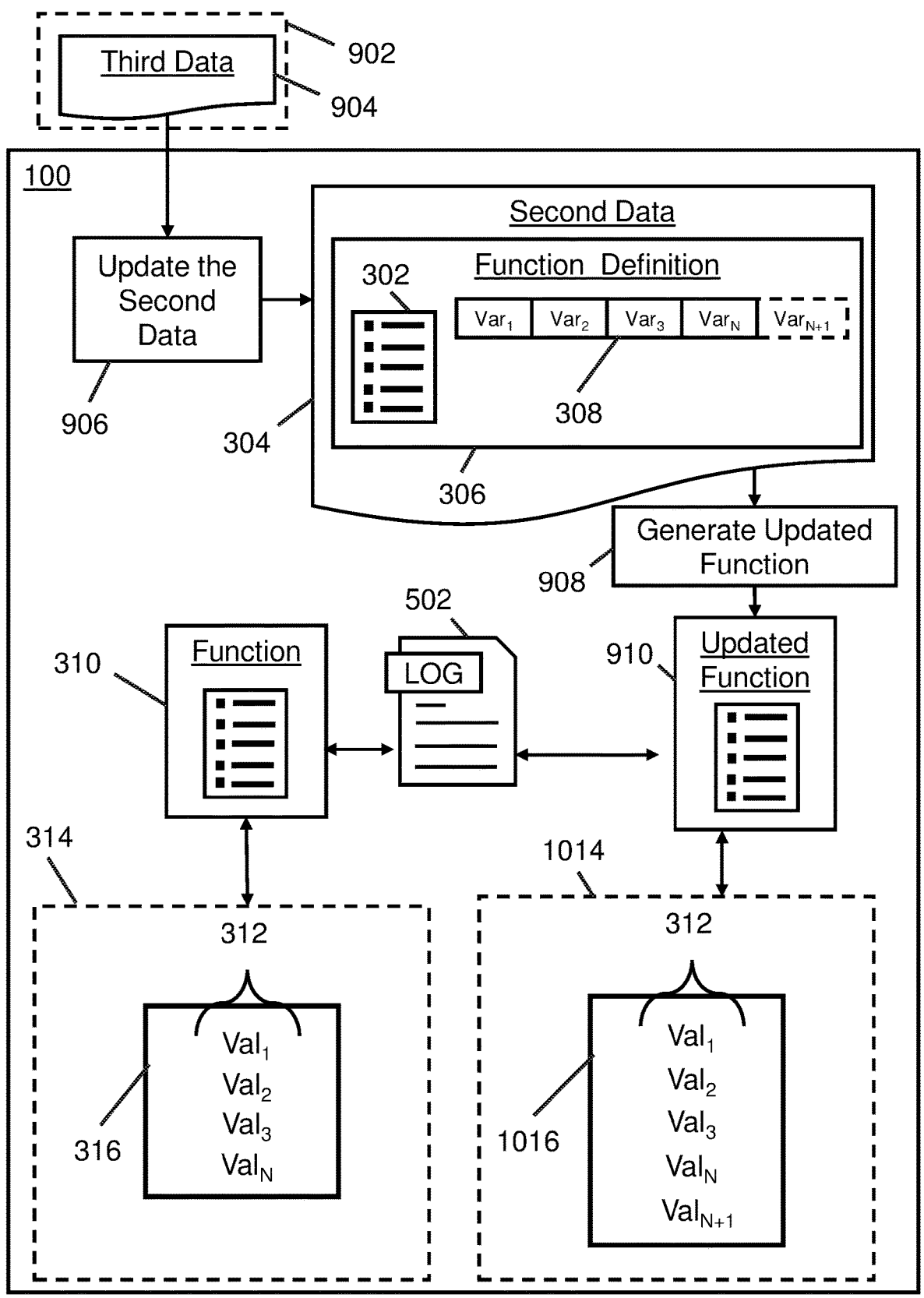
FIG. 10 is a schematic diagram showing an update to a function being performed according to examples in which a new state table is generated.
Figure 11:
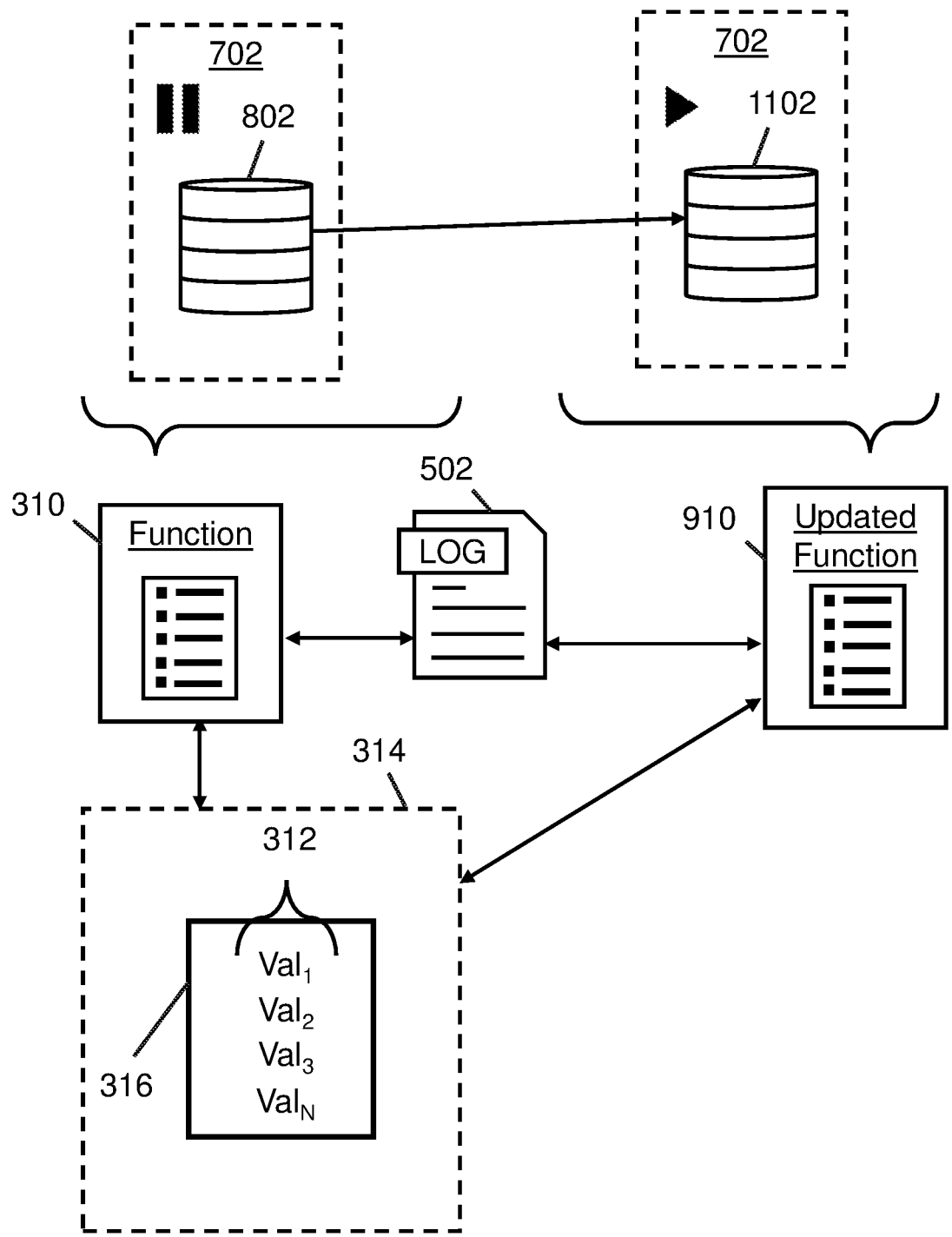
FIG. 11 is a schematic diagram showing an update to a function being performed while an operation is being performed by the function according to examples.

FIG. 10 shows an example of a procedure for updating the function 310 by generating an updated function 910 similar to the process described in relation to FIG. 9. In the example shown in FIG. 10, generating the updated function 910 includes generating an updated state table 1016 according to the modified state variables 308. In the example shown in FIG. 10 the updated state table 1016 which is generated accounts for the additional state variable $Var_{N+1}$. The updated function 910 may be configured to transfer the set of values 312 from the original state table 316 to the updated state table 1016, which now additionally includes value $Val_{N+1}$. In the example shown in FIG. 10 the state table 1016 is stored in a new isolated computing environment 1014 corresponding to the updated function 910.

As described above in relation to FIG. 8, functions 310, 910 in the database system may be implemented using stack-based virtual machines. If the function 310 is to be updated while operations 702 to 706 are being performed by the function 310, the function 310 may be configured to handle this in one of a plurality of ways. In the example shown in FIG. 11, if an operation 702 is being performed when the updated function 910 is being configured to operate on the set of values 312, the function 310 may be configured to pause the operation 702. Data in the stack 802, controlled by the function 310 and being used to perform the operation 702, may be transferred to a new stack 1102 controlled by the updated function 910. The new stack 1102 controlled by the updated function 910 may then be used to resume the operation 702.

Alternatively, when the updated function 910 is configured to operate on the set of values 312, the function 310 may be configured to monitor the operation 702. In this case completing the configuring of the updated function 910 to operate on the set of values 312 may be dependent on an output from the operation 702 being identified. In this way, control over the set of values 312 may only be completely handed over to the updated function 910 after the operations being performed by the function 310 are completed. Waiting for operations 702 to be completed before handing over to the updated function 910 may simplify the procedure for updating the function 310 and thereby mitigate the risk of errors occurring, and ensuring durability and consistency of the functions 310, 910 and the set of values 312 across the database system 100.

The function 310 in the database system 100 may be configured to handle some running operations 702 differently to other operations 704 when the updated function 910 is being configured to operate on the set of values 312 in the isolated computing environment 314. For example, the function 310 may include rules for determining whether a particular operation 702 should be paused, and the respective data transferred to a new stack 1102, whether the particular operation 702 should be left to complete, and/or whether this operation 702 should be canceled before completing the configuration of the updated function 910 to operate on the set of values 312.

In some examples, the database system 100 and/or the function 310 may be configured to process ongoing operations 702 to 706 which are being performed during the update procedure and determine whether each of the ongoing operations 702 to 706 should be completed, canceled, or transferred to the updated function 910.

As described briefly above in relation to FIG. 1, the database system 100 may be implemented using a cluster computer in which computing resources can be scaled up and scaled down to accommodate for demand. In such a device, it is possible to logically separate portions of computing resources from other computing resources and assign these resources to specific functions.

Figure 12:
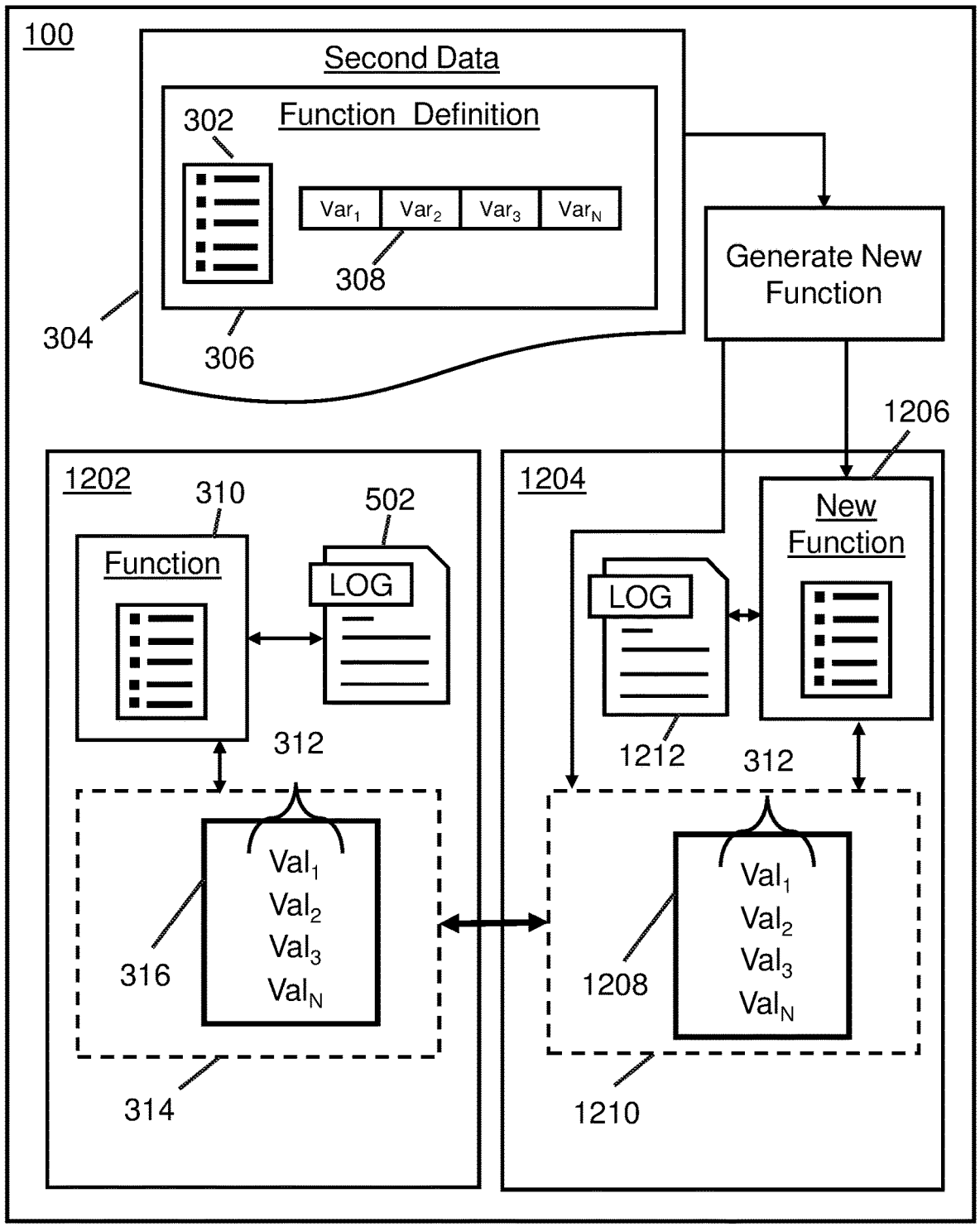
FIG. 12 is a schematic diagram showing the function being migrated from a first set of computing resources to a second set of computing resources according to examples.

FIG. 12 shows an example in which the function 310 is implemented on a first set of computing resources 1202 in the database system 100. For example, the function 310 may be implemented using a specific set of processors and/or storage in the database system 100. The set of computing resources 1202 may be a set of physical resources which are reserved for implementing the function 310. Alternatively, the set of resources 1202 may be virtualized to logically appear as a contiguous set of resources. In some examples, the set of values 312 and the function 310 are implemented on a set of computing resources 1202 which are located in the same jurisdiction i.e. within the same country or in a location governed under the same laws. In jurisdictions where there are data protection laws which govern the movement and storage of data relating to citizens, implementing the function 310 and the set of values 312 on computing resources 1202 in the same jurisdiction provides adherence to these laws.

The method 200 may comprise obtaining a request to migrate the function 310 from the first set of computing resources 1202 to a second, different, set of computing resources 1204.

The request to migrate the function 310 to the second of computing resources 1204 may be triggered by any of a number of conditions, such as the first set of computing resources 1202 having insufficient capacity to implement the function 310 effectively. This may occur where the first set of computing resources 1202 is being used to implement a plurality of such functions and the function 310 is unsuccessfully competing for resources with these other functions. This may also occur where one or more of the set of operations 302 to be implemented by the function 310 requires a larger amount of processing power or storage than is available in the first set of computing resources 1202. The need to migrate the function 310 to the second set of computing resources 1204 may be identified using the execution log 502 in which there will be record of the function 310 struggling to perform operations, either by having a large number of incomplete operations, errors, or high latency times for completing operations recorded in the execution log 502. In other examples, the need to migrate the function 310 may be determined based on a benchmark comparison of the performance of the function 310 against one or more performance thresholds relating to, for example, latency, error rate, power consumption, and so forth.

Other conditions which may trigger the request to migrate the function 310 to the second set of resources 1202 are where one or more of the set of operations 302 to be performed by the function 310 requires data that is stored in the second set of resources 1204. Implementing a function 310 on the same set of computing resources 1204 where relevant data is stored can reduce latency time when the function 310 is performing operations. Where one of the set of operations 302 implements a high volume of reads and/or writes to data, reducing the latency of each read and/or write operation even by a small amount can yield large gains in overall efficiency.

In some examples, there may be legal restrictions on the movement of data between jurisdictions. Some jurisdictions have data protection laws which set out restrictions on the movement of data relating to citizens outside of these jurisdictions. Civil contracts may also be in place between companies and/or individuals which restrict what can and cannot be done with an individual's data, including the movement of this data. In some examples, the first set of computing resources 1202 are at a first geographic location and the second set of computing resources 120 are at a second geographic location that is different to the first geographic location. The geographic location in this case may relate to a separate physical computing device located near to each other, for example in the same data warehouse, in separate physical computing devices located in different datacenters or warehouses, or in different countries or jurisdictions.

In response to the request to migrate the function 310 to the second set of resources 1204, a new function 1206 may be generated according to the second data 304, the new function 1206 being implemented on the second set of computing resources 1204. The new function 1206 may be provisioned with a reference to the set of values 312. This reference may be a memory or storage address in which the set of values 312 are located in the first set of computing resources 1202, or, where the set of values 312 are stored in a state table 316, the reference may be a reference to the state table 316 and/or information needed to search the state table 316 to identify or modify the set of values 312 stored therein. In other examples, such as where the isolated computing environment 314 is implemented as a virtual machine, the reference may be a virtual machine ID.

The method 200 may comprise configuring the new function 1206 to operate on the set of values 312 in the isolated computing environment 314. This may involve providing the new function 1206 with a key and/or otherwise authorizing the second function 1206 to operate in the isolated environment 314. In the example shown in FIG. 12, the method 200 may also comprise generating a new state table 1208 in the second set of computing resources 1204 and the new function 1206 may migrate the set of values 312 from the original state table 316 in the first set of resources 1202 to the new state table 1208 in the second set of resources 1204. In examples where the new function 1206 migrates the set of values 312 to the second set of resources 1204, an isolated computing environment 1210 may be established in the second set of computing resources 1204 to store the set of values 312. A new execution log 1212 may also be implemented in the second set of resources 1204 to record operations performed by the new function 1206. Alternatively, the new function 1206 may use the same execution log 502 as the original function 310. While execution logs 502 and 1212 are shown in FIG. 12 as being included in each of the first 1202 and second 1204 sets of computing resources respectively, it is to be appreciated that in other examples, the execution log(s) 502, 1212 may be stored separately to the first 1202 and second 1204 sets of computing resources. For instance, the execution log 502 may be stored in a set of computing resources which are separate to the first or second sets of computing resources and may be used to record data indicating events and operations relating a plurality of different functions, including functions 310 and 1206.

Figure 13:
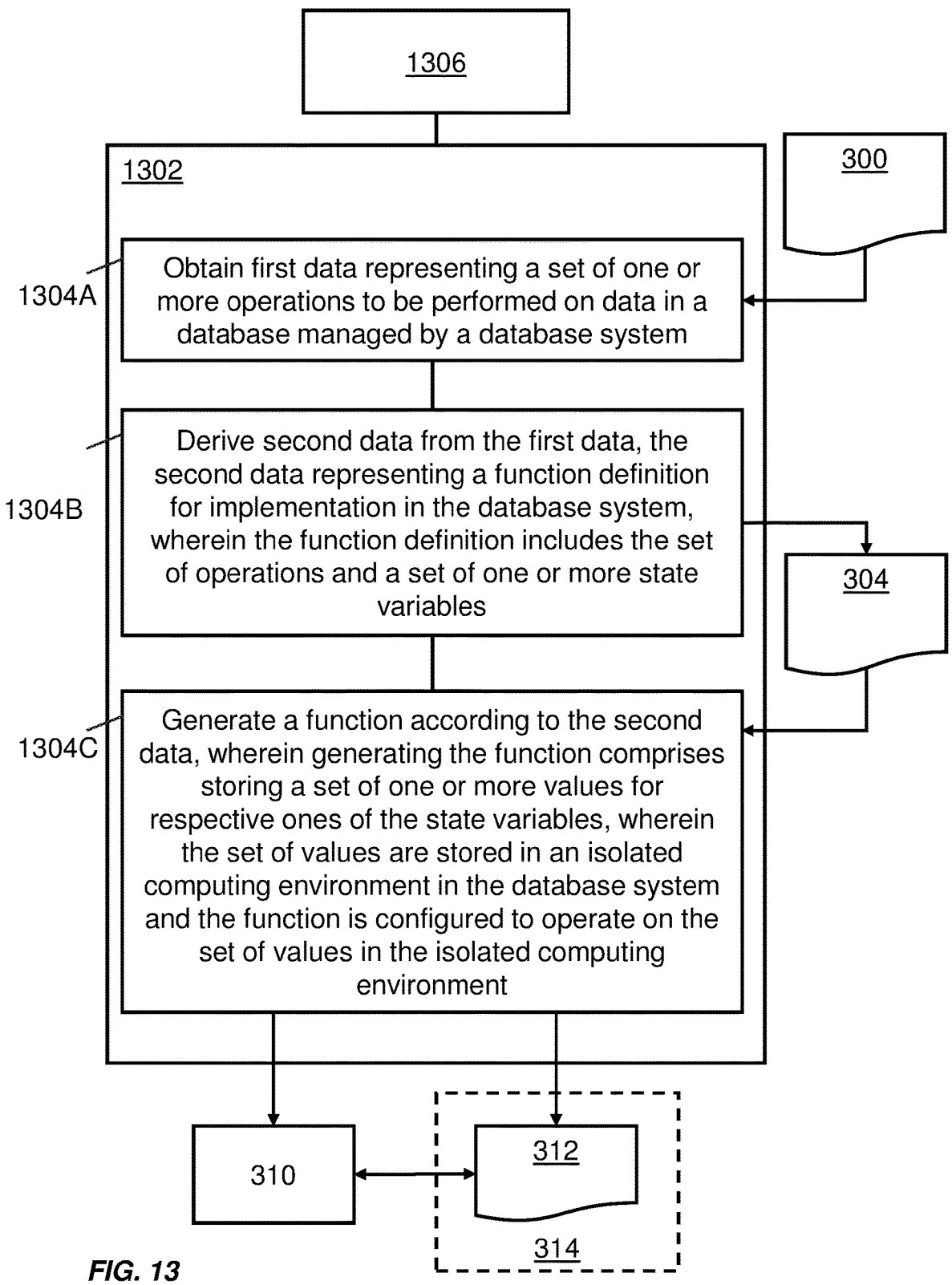
FIG. 13 is a schematic diagram showing a non-transitory computer-readable storage medium according to examples.

FIG. 13 shows a non-transitory computer-readable storage medium 1302 comprising computer-executable instructions 1304A to 1304C which, when executed by one or more processors 1306, cause the one or more processors 1306 to perform a method 200. A first instruction block 1304A, when executed, causes the processor(s) 1306 to obtain first data 300 representing a set of one or more operations 302 to be performed on data in a database managed by a database system 100. A second instruction block 1304B, when executed, causes the processor(s) 1306 to derive second data 304 from the first data 300, the second data 304 representing a function definition, not shown in FIG. 12 for simplicity, for implementation in the database system 100. The function definition includes the set of operations and a set of one or more state variables. A third instruction block 1304C, when executed, causes the processor(s) 1306 to generate a function 310 according to the second data 304, wherein generating the function 310 comprises storing a set of one or more values 312 for respective ones of the state variables. The set of values 312 are stored in an isolated computing environment 314 in the database system 100, the function 310 being configured to operate on the set of values in the isolated computing environment 314.

The above examples are to be understood as illustrative. It is to be understood that any feature described in relation to any one example may be used alone, or in combination with other features described, and may also be used in combination with one or more features of any other of the examples, or any combination of any other of the examples. Furthermore, equivalents and modifications not described above may also be employed.

What is claimed is:

1. A computer-implemented method for managing functions in a database system, the method comprising:
    obtaining first data representing a set of one or more operations to be performed on data in a database managed by a database system;
    deriving second data from the first data, the second data representing a function definition for implementation in the database system, wherein the function definition includes the set of operations and a set of one or more state variables; and
    generating a function according to the second data, wherein generating the function comprises storing a set of one or more values for respective ones of the state variables,
    wherein the set of values are stored in an isolated computing environment in the database system and the function is configured to operate on the set of values in the isolated computing environment;
    wherein the function is a first function, and wherein the computer-implemented method comprises:
        obtaining a request to update the function definition, the request including third data representing an update to be performed to the function definition;
        updating the second data based on the third data;
        generating a second function according to the updated second data, wherein generating the second function comprises provisioning the second function with a reference to the set of values associated with the first function; and
        configuring the second function to operate on the set of values in the isolated computing environment.

2. A computer-implemented method according to claim 1, wherein the function includes the set of operations, and wherein at least one of the operations is configured to update one or more of the set of values.

3. A computer-implemented method according to claim 1, wherein the computer-implemented method comprises storing an execution log comprising data indicative of operations having been performed by the function, and wherein the function is configured to write data indicative of operations which are performed by the function to the execution log.

4. A computer-implemented method according to claim 1, wherein each of the set of operations is associated with an event, and wherein the computer-implemented method comprises configuring the function to:
    obtain an indication of an event; and
    in response to the indication, performing at least one associated operation, wherein on completion the operation generates an output.

5. A computer-implemented method according to claim 4, wherein the event includes any one or more of:
    an input from a user;
    an instruction from one or more further functions operating in the database system;
    an output from one or more further functions operating in the database system; or
    an output from an operation performed by the function.

6. A computer-implemented method according to claim 4, wherein the function is implemented using a stack-based virtual machine and wherein the computer-implemented method comprises configuring the function to:
    create a stack in response to obtaining the indication of the event, wherein performing the at least one associated operation comprises performing the associated operation using the stack; and
    in response to the operation generating the output, deleting the stack.

7. A computer-implemented method according to claim 1, wherein the function is configured to perform operations asynchronously.

8. A computer-implemented method according to claim 1, wherein the set of values are stored in a state table and wherein one or more further functions are configured to query the state table to read one or more values stored therein.

9. A computer-implemented method according to claim 1, wherein the set of values and the function are implemented on a set of computing resources located in the same jurisdiction.

10. A computer-implemented method according to claim 1, wherein the function is implemented using a linear memory model.

11. A computer-implemented method according to claim 1, wherein the set of values are stored in a state table, the update includes modifying the state variables associated with the function definition, and wherein generating the second function includes modifying the state table in which the values are stored according to the modified state variables.

12. A computer-implement method according to claim 1, wherein the set of values is stored in a first state table, the update includes modifying the state variables associated with the function definition, and wherein generating the second function includes generating a second state table according to the modified state variables, the second function being configured to transfer the set of values from the first state table to the second state table.

13. A computer-implemented method according to claim 1, wherein the first and second functions are implemented using respective stack-based virtual machines, each operation being implemented using a stack, and wherein if a said operation is being performed when the second function is being configured to operate on the set of values, the first function is configured to:
pause the said operation; and
transfer data in a first stack controlled by the first function and used to perform the said operation to a second stack controlled by the second function.

14. A computer-implemented method according to claim 1, wherein the first and second functions are implemented using respective stack-based virtual machines, each operation being implemented using a stack, and wherein if a said operation is being performed when the second function is being configured to operate on the set of values, the first function is configured to monitor the said operation to identify an output from the said operation, wherein completing the configuring of the second function to operate on the set of values is dependent on an output from the said operation being identified by the first function in the monitoring.

15. A database system for implementing one or more functions which are configured to operate on data stored in the database system, the database system comprising:
one or more processors; and
storage comprising computer-executable instructions which, when executed by the one or more processors, cause the database system to:
obtain first data representing a set of one or more operations to be performed on data in a database managed by a database system;
derive second data from the first data, the second data representing a function definition for implementation in the database system, wherein the function definition includes the set of operations and a set of one or more state variables; and
generate a function according to the second data, wherein generating the function comprises storing a set of one or more values for respective ones of the state variables,
wherein the set of values are stored in an isolated computing environment in the database system, the function being configured to operate on the set of values in the isolated computing environment;
wherein the function is a first function, and wherein the database system to:
obtain a request to update the function definition, the request including third data representing an update to be performed to the function definition;
update the second data based on the third data;
generate a second function according to the updated second data, wherein generating the second function comprises provisioning the second function with a reference to the set of values associated with the first function; and
configure the second function to operate on the set of values in the isolated computing environment.

16. A computer-implemented method for managing functions in a database system, the method comprising:
obtaining first data representing a set of one or more operations to be performed on data in a database managed by a database system;
deriving second data from the first data, the second data representing a function definition for implementation in the database system, wherein the function definition includes the set of operations and a set of one or more state variables; and
generating a function according to the second data, wherein generating the function comprises storing a set of one or more values for respective ones of the state variables,
wherein the set of values are stored in an isolated computing environment in the database system and the function is configured to operate on the set of values in the isolated computing environment;
wherein the function is a first function, the database system comprises a first set of computing resources on which the first function is implemented and a second set of computing resources that are different to the first set of computing resources, and wherein the computer-implemented method comprises:
obtaining a request to migrate the first function from the first set of computing resources to the second set of computing resources;
generating a second function according to the second data, the second function being implemented on the second set of computing resources, wherein generating the second function includes provisioning the second function with a reference to the set of values associated with the first function; and
configuring the second function to operate on the set of values in the isolated computing environment.

17. A computer-implemented method according to claim 16, wherein the set of values are stored in a first state table, generating the second function includes generating a second state table, and the second function is configured to migrate the set of values from the first state table to the second state table.

18. A computer-implemented method according to claim 16, wherein the first set of computing resources are at a first geographic location and the second set of resources are at a second geographic location that is different to the first geographic location.

19. A non-transitory computer-readable storage medium comprising computer-executable instructions which, when executed by one or more processors, cause the one or more processors to:
obtain first data representing a set of one or more operations to be performed on data in a database managed by a database system;
derive second data from the first data, the second data representing a function definition for implementation in the database system, wherein the function definition includes the set of operations and a set of one or more state variables; and
generate a function according to the second data, wherein generating the function comprises storing a set of one or more values for respective ones of the state variables,
wherein the set of values are stored in an isolated computing environment in the database system, the function being configured to operate on the set of values in the isolated computing environment;

wherein the function is a first function, the database system comprises a first set of computing resources on which the first function is implemented and a second set of computing resources that are different to the first set of computing resources, and wherein the computer-executable instructions, when executed by the one or more processors, cause the one or more processors to:
- obtain a request to migrate the first function from the first set of computing resources to the second set of computing resources;
- generate a second function according to the second data, the second function being implemented on the second set of computing resources, wherein generating the second function includes provisioning the second function with a reference to the set of values associated with the first function; and
- configure the second function to operate on the set of values in the isolated computing environment.

* * * * *